United States Patent [19]

Bouiller et al.

[11] Patent Number: 5,934,564
[45] Date of Patent: Aug. 10, 1999

[54] VARIABLE GEOMETRY TURBOJET ENGINE EXHAUST NOZZLE

[75] Inventors: Philippe Pierre Vincent Bouiller, Samoreau; Pierre Yves Bourquin, Paris; Gérard Ernest André Jourdain, Saintry; Jean-Pierre Ruis, Le Chatelet En Brie, all of France

[73] Assignee: Societe Nationale D'Etude et de Construction de Moteurs D'Aviation (SNECMA), Paris, France

[21] Appl. No.: 08/874,507

[22] Filed: Jun. 13, 1997

[30] Foreign Application Priority Data

Jun. 20, 1996 [FR] France ................................. 9607666

[51] Int. Cl.⁶ ............................................. B05B 12/00
[52] U.S. Cl. ............................. 239/265.37; 239/265.33; 60/271
[58] Field of Search ....................... 239/265.19, 265.33, 239/265.37, 265.39; 60/271

[56] References Cited

U.S. PATENT DOCUMENTS

| | | |
|---|---|---|
| 2,969,189 | 1/1961 | Jordan . |
| 4,141,501 | 2/1979 | Nightingale . |
| 5,235,808 | 8/1993 | Taylor ........................................ 60/271 |
| 5,398,499 | 3/1995 | Urrela ........................................ 60/271 |
| 5,571,262 | 11/1996 | Camboulives ............................. 60/271 |

FOREIGN PATENT DOCUMENTS

| | | |
|---|---|---|
| 0 091 786 | 10/1983 | European Pat. Off. . |
| 0 299 832 | 1/1989 | European Pat. Off. . |
| 1225736 | 7/1960 | France . |
| 1588791 | 5/1970 | France . |
| 2 698 409 | 5/1994 | France . |
| 2 714 422 | 6/1995 | France . |
| 2 715 192 | 7/1995 | France . |
| 2 724 977 | 3/1996 | France . |
| 2 254 377 | 10/1992 | United Kingdom . |

*Primary Examiner*—Charles G. Freay
*Attorney, Agent, or Firm*—Bacon & Thomas

[57] ABSTRACT

A variable geometry exhaust nozzle is disclosed for a turbojet engine having a rear portion, the nozzle having an outer flap ring with a plurality of driven outer flaps and a plurality of outer interlock flaps, each outer flap being pivotally connected to the rear portion of the turbojet engine, and an inner flap ring having a plurality of inner forward driven flaps and a plurality of inner forward interlock flaps, each having a forward portion pivotally attached to the rear portion of the turbojet engine, the inner flap ring also having a plurality of inner rear driven flaps and a plurality of inner rear interlock flaps, each inner rear flap having a front edge portion pivotally connected to a rear edge portion of a corresponding inner forward flap. The inner and outer flap rings are radially spaced apart and are arranged symmetrically about an axis of symmetry, with a drive collar located in the space between the inner and outer flaps that is movable between forwardmost and rearmost positions in a direction substantially parallel to the axis of symmetry of the nozzle. A plurality of translating levers are each pivotally attached to the drive collar and to one of the inner forward driven flaps. A plurality of interlock levers are each pivotally connected to one of the translating levers and to one of the inner rear driven flaps. Each interlock lever is connected to one of the outer driven flaps by a link rod pivotally connected to the interlock lever and to the outer driven flaps. Actuators are connected to the rear portion of the turbojet engine and to the translating levers to move the drive collar between its forwardmost and rearmost positions, such movement causing the inner flap ring to move between a converging-diverging configuration and a converging— converging configuration. Thus, the nozzle is suitable for both subsonic and supersonic aircraft operation.

9 Claims, 6 Drawing Sheets

VARIABLE GEOMETRY TURBOJET ENGINE EXHAUST NOZZLE

BACKGROUND OF THE INVENTION

The present invention relates to a variable geometry exhaust nozzle for an aircraft turbojet engine, more particularly such a variable geometry exhaust nozzle having a single drive collar controlling the positions of all of the exhaust nozzle flaps.

Variable geometry exhaust nozzles for turbojet engines typically comprise inner and outer flap rings wherein each ring has a plurality of driven flaps and a plurality of interlock flaps circumferentially extending between adjacent driven flaps. The plurality of flaps in the outer ring have a forward edge portion pivotally attached to the turbojet engine structure. The inner flap ring may comprise a plurality of inner forward flaps, again having driven flaps and interlock flaps, with the forward edges of the inner forward flaps pivotally connected to the jet engine structure. The inner flap ring also may comprise a plurality of inner rear flaps, each having a forward edge portion pivotally attached to a rear edge portion of a corresponding inner forward flap. Again, the inner rear flaps may comprise driven flaps circumferentially joined by interlock flaps.

Such known nozzles utilize control systems to vary the angular configurations of the flaps relative to a nozzle centerline to vary the configuration of the inner flap ring between a converging-diverging nozzle configuration necessary for supersonic aircraft operation and a converging—converging configuration for subsonic operations. The positions of the outer flaps also move when the inner flaps change the configuration of the nozzle outlet.

The known types of nozzles may be attached directly to the jet engine exhaust, or may be attached to the rearmost portion of a turbojet engine afterburner.

French Patent No. 2,698,409 discloses a variable geometry exhaust nozzle wherein the driven flaps of the outer flap ring are connected to an actuating collar by a cam device and wherein the inner rear driven flaps are connected by link rods to a cowling structure that is axially displaceable to maneuver the flaps into the desired exhaust nozzle configuration. This design necessitates two separate drive systems having two control circuits. French Patents Nos. 1,225,736 and 1,588,791 also disclose variable geometry exhaust nozzles having three sets of flaps and two separate drive systems. The use of such separate drive systems increases the complexity of the nozzle structure, thereby inherently reducing its reliability, and increasing the weight of the nozzle structure.

SUMMARY OF THE INVENTION

A variable geometry exhaust nozzle is disclosed for a turbojet engine having a rear portion, the nozzle having an outer flap ring with a plurality of driven outer flaps and a plurality of outer interlock flaps, each outer flap being pivotally connected to the rear portion of the turbojet engine, and an inner flap ring having a plurality of inner forward driven flaps and a plurality of inner forward interlock flaps, each having a forward portion pivotally attached to the rear portion of the turbojet engine, the inner flap ring also having a plurality of inner rear driven flaps and a plurality of inner rear interlock flaps, each inner rear flap having a front edge portion pivotally connected to a rear edge portion of a corresponding inner forward flap. The inner and outer flap rings are radially spaced apart and are arranged symmetrically about an axis of symmetry, with a drive collar located in the space between the inner and outer flaps that is movable between forwardmost and rearmost positions in a direction substantially parallel to the axis of symmetry of the nozzle. A plurality of translating levers are each pivotally attached to the drive collar and to one of the inner forward driven flaps. A plurality of interlock levers are each pivotally connected to one of the translating levers and to one of the inner rear driven flaps. Each interlock lever is connected to one of the outer driven flaps by a link rod pivotally connected to the interlock lever and to the outer driven flaps. Actuators are connected to the rear portion of the turbojet engine and to the translating levers to move the drive collar between its forwardmost and rearmost positions, such movement causing the inner flap ring to move between a converging-diverging configuration and a converging—converging configuration. Thus, the nozzle is suitable for both subsonic and supersonic aircraft operation.

Between its extreme operating configurations, the nozzle may assume intermediate configurations when the engine is operated between low power and full power. The nozzle may thereby increase thrust, or specific fuel consumption in all engine operating modes.

An object of the present invention is to provide a variable geometry exhaust nozzle having three sets of movable flaps wherein all three sets are actuated by a single drive system thereby achieving economies in both weight and cost. The drive collar of the present invention assures synchronization of the movement of all three of the flaps and the drive collar is automatically centered by the inner rear flaps. By using translating levers, the present invention has reduced the stresses incurred by the actuating mechanism thereby enabling the use of smaller actuators. If the actuators are of the hydraulic type, they may be fed by a smaller feed pump, again achieving a savings in both weight and cost.

The drive collar has a polygonal configuration in a plane generally transverse to the axis of symmetry of the nozzle to avoid a bending deformation in the collar during the flap movement.

DETAILED DESCRIPTION OF THE PREFERRED EMBODIMENTS

Figure 1:
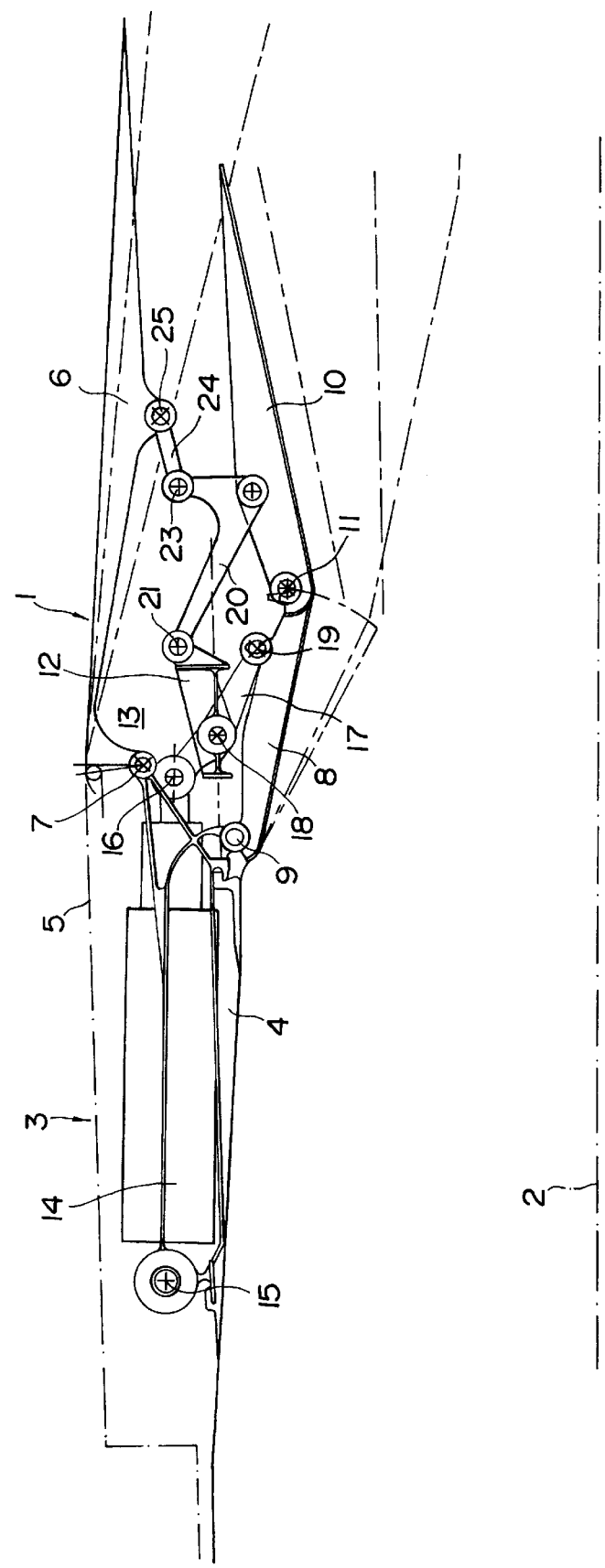
FIG. 1 is a partial, longitudinal, cross-sectional view of the variable geometry nozzle according to the present invention in its fully open converging-diverging configuration.

The present invention relates to an axially symmetrical nozzle assembly 1 having an axis of symmetry 2 which is mounted on the rear portion 3 of a turbojet engine. As indicated previously, the nozzle may be attached directly to the exhaust pipe of the turbojet engine, or may be attached to the rear end of an afterburner.

The nozzle assembly 1 comprises three rings of flaps, each ring constituted by a plurality of circumferentially spaced apart driven flaps and circumferentially interconnected in known fashion by a plurality of interlock flaps. The flap rings are coaxial about the axis of symmetry 2. The inner flap ring axially extends the outer boundary of the exhaust pipe 4 of the turbojet engine, or of the after burner, and is formed by two sets of flaps, identified as the inner forward flaps and the inner rear ring of flaps. The outer flap ring is radially spaced from the inner forward and rear flap rings and forms an extension of a fairing 5 enclosing the exhaust pipe 4. The outer flap ring comprises a plurality of flaps 6 pivotally attached at their front edges to the engine structure so as to pivot about hinge axis 7.

The inner forward flaps 8 are pivotally connected at their forward edges to the rear portion of the engine structure so as to pivot about axis 9. Each inner forward flap 8 has a rear edge portion that is pivotally connected to a forward edge portion of an inner rear flap 10 so as to enable the relative pivoting movement between these flaps about axis 11.

According to the present invention, the positions of the three sets of flaps 6, 8 and 10 is defined by the axial position of drive collar 12 movable in a direction substantially parallel to the axis of symmetry 2. The drive collar 12 extends about the axis of symmetry and is mounted in the annular space 13 between the ring of inner forward flaps 8 and the ring of outer flaps 6. The collar 12 is axially displaceable by a plurality of actuators 14 connected to the rear portion of the turbojet engine at 15.

A plurality of translating levers 17 are each pivotally connected to the drive collar 12 so as to pivot about axis 18 and are pivotally connected to an inner forward driven flap at pivot 19. The translating levers 17 are each connected to the extendible and retractable rod 15 of an actuator 14 at pivot 16. As clearly shown in FIGS. 1, 2 and 3, the movement of the control rod 15 will axially move drive collar 12, while at the same time pivoting the translating levers 17 with respect to the drive collar 12 about axis 18. As the rod 15 is extended from the actuator 14, the translating lever 17 will pivot about axis 18 with respect to the drive collar 12 in a clockwise direction as the drive collar 12 axially moves along the axis of symmetry 2.

Each rear driven flap 10 is connected to the drive collar 12 by an interlock lever 20 having three hinge axes 21, 22 and 23 that are parallel to each other, but not coplanar. Hinge axis 21 pivotally connects the interlock lever 20 to the drive collar 12, while hinge axis 22 pivotally connects the interlock lever 20 to an inner, rear driven flap 10. Hinge axis 23 pivotally connects link rod 24 to the interlock lever 20, which link rod also is pivotally connected to a driven outer flap 6 at pivot 25.

The three rings of flaps 6, 8 and 10 each comprise the same number of driven flaps and interlock flaps and the number of actuators 14 equals the number of driven flaps in each ring. Each actuator 14 drives a single translating lever 17 which is connected to a single inner forward driven flap 8 and to the drive collar 12.

Due to the kinematics of the drive system of the present invention, the geometries of the three rings of flaps 6, 8 and 10 and the cross-section of the nozzle opening vary as a function of the axial position of the drive collar 12 relative to the rear portion of the turbojet engine. The movement of the drive collar 12 is limited by the stroke of the actuators 14, the drive collar 12 serving to synchronize the motion of all of the actuators 14.

FIG. 1, in solid lines, shows the variable geometry exhaust nozzle in a converging-diverging configuration when the actuating rods 15 are in their fully retracted position. In this position, the drive collar 12 is in its forwardmost position (towards the left as viewed in FIG. 1). The positions of these elements corresponds to the maximum throttle position and supersonic operation of the aircraft, or when the afterburner is in the full power mode.

Figure 2:
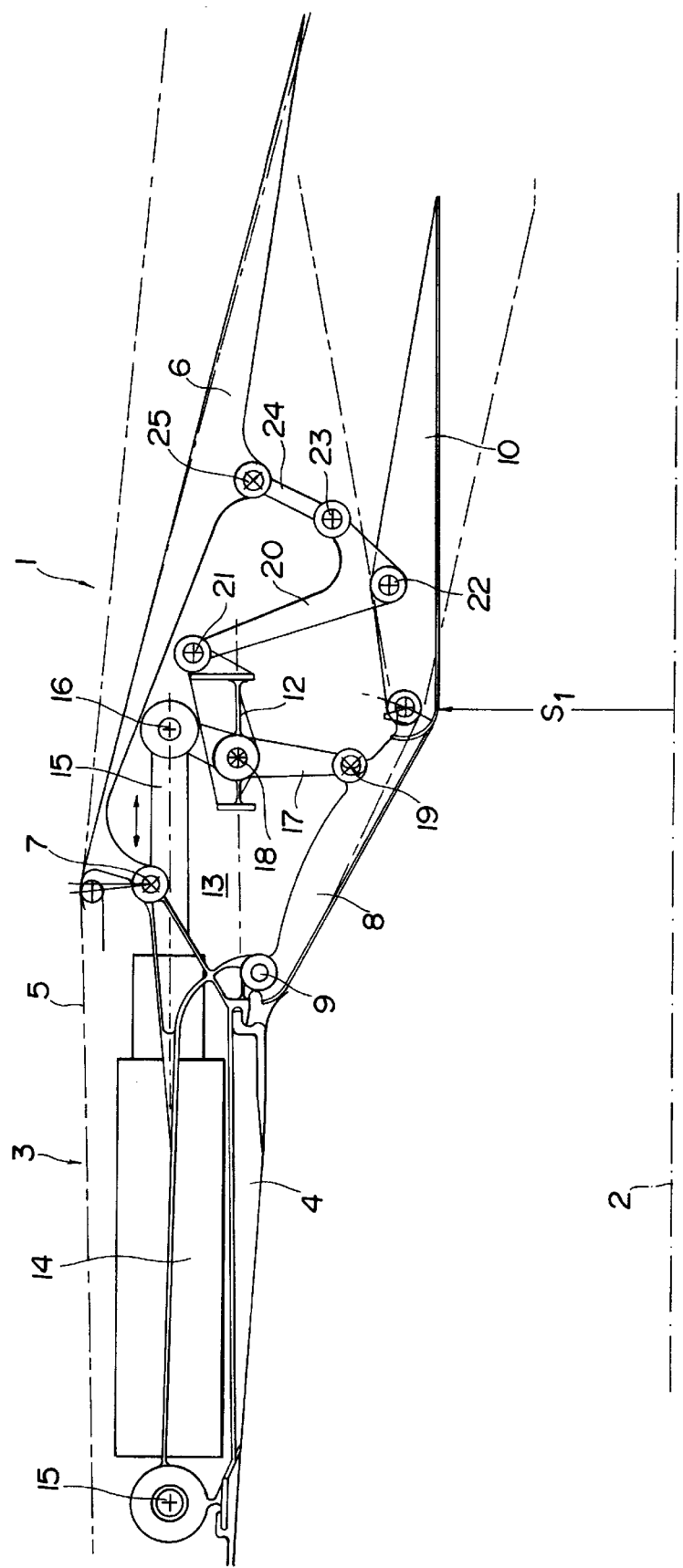
FIG. 2 is a partial, longitudinal, cross-sectional view similar to FIG. 1 illustrating the nozzle according to the invention in an intermediate converging-diverging configuration.

FIG. 2, in solid lines, discloses an intermediate converging-diverging configuration of the inner flap rings with the outlet cross-sectional dimension S1 of the inner forward flaps being at a minimum.

Figure 3:
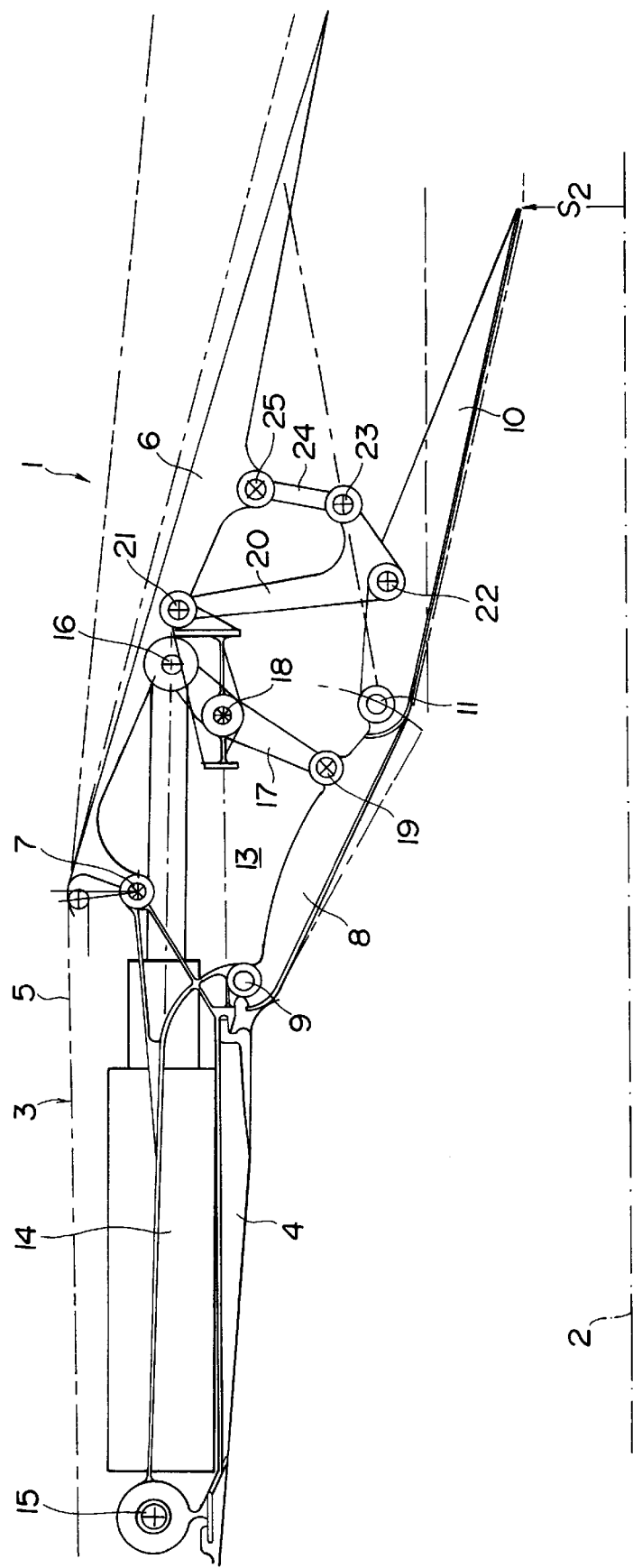
FIG. 3 is a partial, longitudinal, cross-sectional view similar to FIGS. 1 and 2 illustrating the nozzle in its closed, converging—converging configuration.

FIG. 3 discloses the positions of the elements with the actuating rod at its maximum extension and the nozzle in its fully closed, converging—converging configuration with the outlet cross-section S2 of the nozzle at a minimum.

Figure 4:
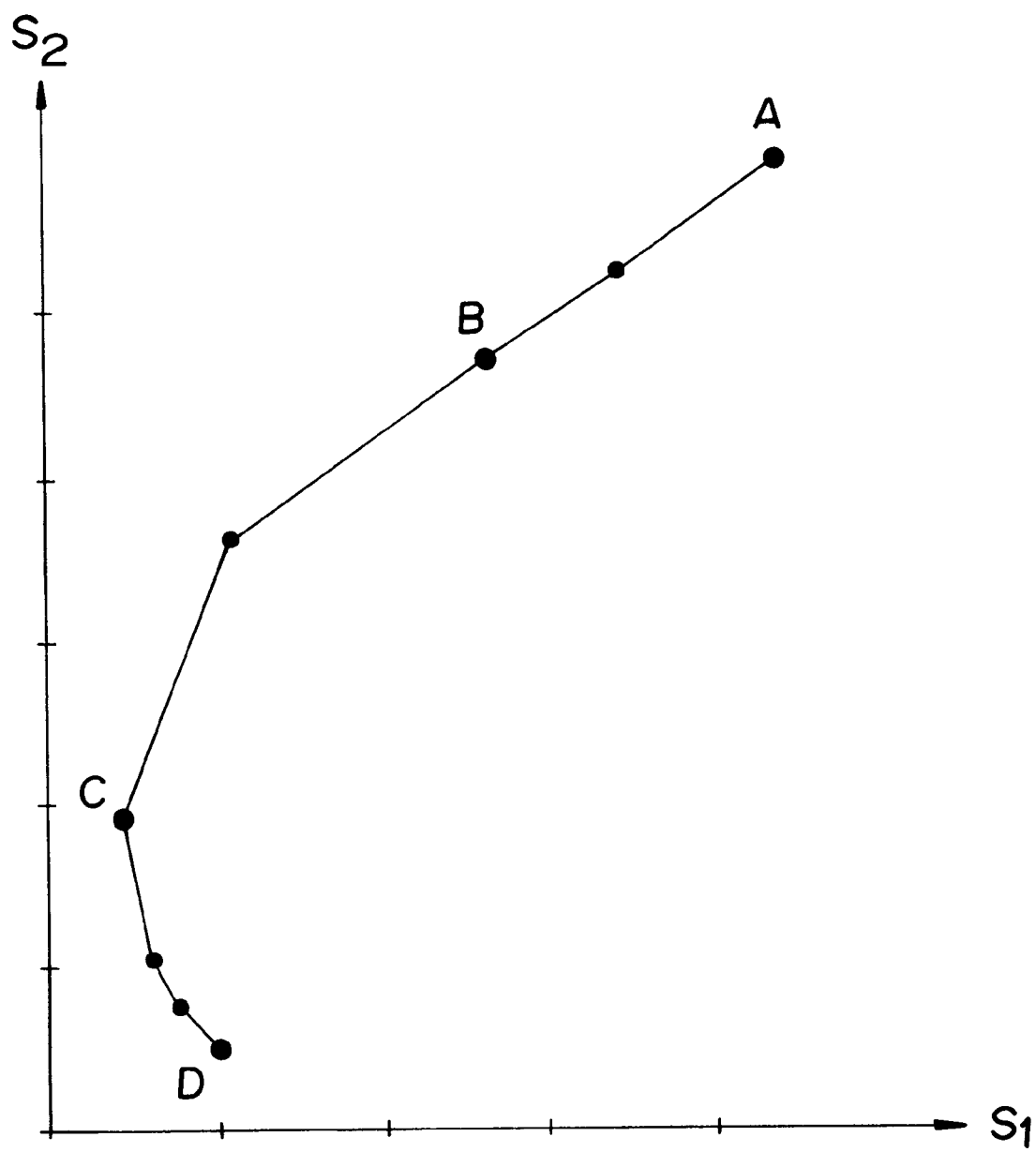
FIG. 4 is a graphic representation of the outlet cross-section of the exhaust nozzle as a function of the outlet cross-section of the forward inner flaps.

The positions of the various hinge axes of the levers and link rods determines the cross-sections S1 and S2 as a function of the strokes of the actuators 14. FIG. 4 is a graphical representation of the cross-sectional dimension S2 as a function of the cross-sectional dimension S1. The points A, C and D in FIG. 4 correspond to the configurations illustrated in FIGS. 1, 2 and 3. Point B in FIG. 4 corresponds to an intermediate converging-diverging configuration. The movement of the outer flaps 6 are limited to meet the requirements of external air flow to reduce aerodynamic drag.

In moving between the "fully open" nozzle position illustrated in FIG. 1 to the intermediate position illustrated in FIG. 2, both having a converging-diverging configurations, the actuating rods 15 move from the actuator 14 from fully retracted position to a partially extended position. Such movement displaces the drive collar 12 rearwardly in a direction substantially parallel to the axis of symmetry 2 while simultaneously causing the translating levers 17 to rotate clockwise about their hinge axes 18 and to cause clockwise movement of the interlock levers 20. As a result, the inner forward flaps 8 are moved toward a more converging configuration and inner rear flaps 10 are moved to a position defining a smaller outlet cross-sectional area. If the extension of the actuators 15 proceeds, the inner ring flaps assume the converging—converging configuration as illustrated in FIG. 3.

The drive collar 12 ensures the displacement of the three rings of flaps and assures that their respective movements will be synchronized. This enables the elimination of any separate synchronizing system utilized by some of the known adjustable nozzles. The drive collar is self-centering relative to the three rings of flaps 6, 8 and 10 due to its connection with the inner forward driven flaps 8. The drive collar 12, however, does not apply any torsional stresses to the flaps 8 about the axis 2 since it undergoes only axial movement.

Figure 5:
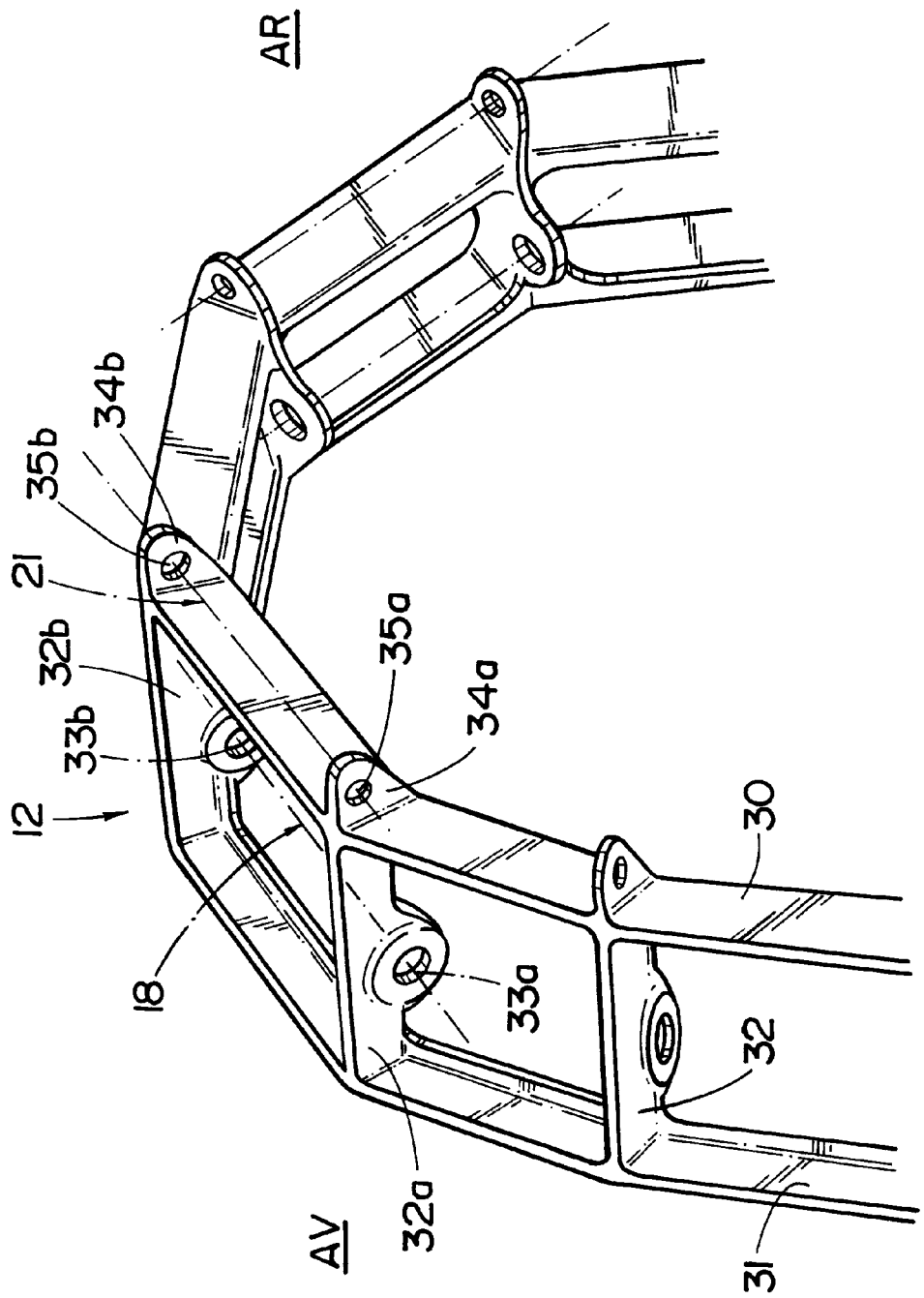
FIG. 5 is a partial, perspective view of the drive collar according to the present invention.

A portion of the drive collar 12 is illustrated in FIG. 5. As can be seen, the drive collar 12 has a polygonal shape with the number of sides of the polygon equal to the number of flaps in each of the flap rings. The drive collar 12 comprises two axially spaced polygonal rings 30 and 31 connected by axial members 32 extending between the corresponding vertices of the rings 30 and 31, to withstand the stresses transmitted by the translating levers 17 and the interlock levers 20. Adjacent axial members 32a and 32b positioned on opposite sides of the same inner forward driven flap 8 define aligned openings 33a and 33b, the centers of which define the hinge axis 18 of a translating lever 17. Lugs 34a and 34b extend rearwardly from the rear polygonal ring 30 and have aligned openings 35a and 35b, the centers of which define the hinge axis 21 of an interlock lever 20 relative to the drive collar 12. The polygonal structure of the drive collar 12 undergoes solely tensile or compressive stresses and is free of any bending stress.

Figure 6:
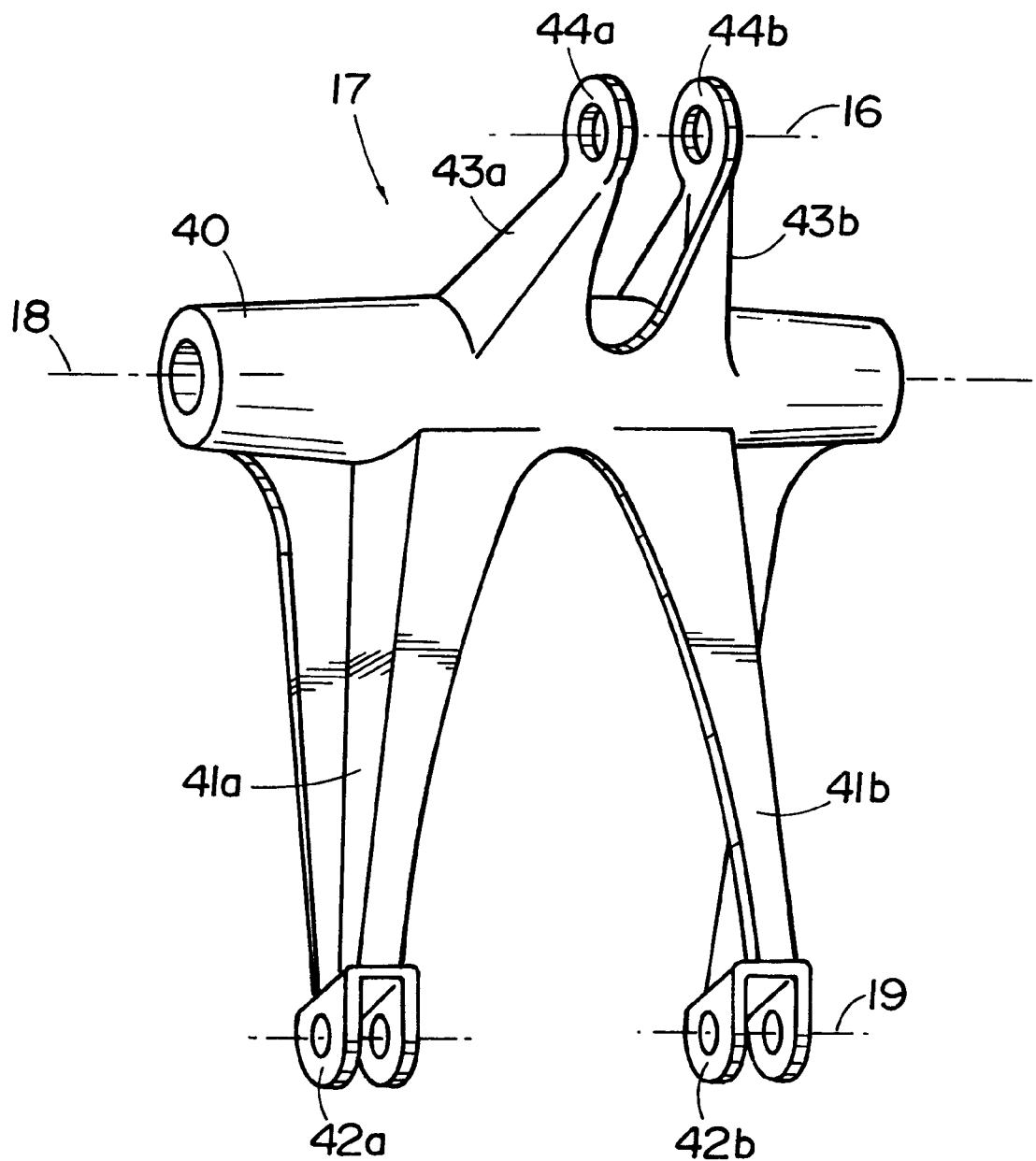
FIG. 6 is a perspective view of a translating lever according to the present invention.

FIG. 6 is a perspective view of a translating lever 17. Translating lever 17 comprises a journal hub 40 that extends between two adjacent spacers 32a, 32b on the drive collar 12 and is attached to the drive collar 12 so as to pivot relative thereto about axis 18. Two first arms 41a and 41b are fixed to the bearing hub 40 and extend therefrom substantially parallel to each other. The distal ends of the two first arms have mounting yokes 42a and 42b to be pivotally attached to corresponding bosses on the inner forward driven flap so as to pivot about hinge axis 19. Two second arms 43a and 43b also fixedly extend from the journal hub 40 in directions substantially parallel to each other and have lugs 44a and 44b with aligned openings, the centers of the holes being attached to an end of an actuator rod 15 so as to enable relative pivoting movement about axis 16. All of the pivot hinge axes extend substantially transverse to the axis of symmetry 2.

Due to the kinematics of the present invention, the forces exerted by the actuators on the two second arms 43a, 43b are lower than the forces that would be required if the actuators were directly attached to the drive collar 12. In addition, the drive collar 12 is subjected solely to radial forces. Accordingly, the variable geometry nozzle may be controlled utilizing smaller actuators 14 than would otherwise be the case, and smaller feed pumps. Thus, the nozzle structure according to the present invention is lighter than the prior art devices and the hinge devices are also smaller.

The foregoing description is provided for illustrative purposes only and should not be construed as in any way limiting this invention, the scope of which is defined solely by the appended claims.

We claim:

1. A variable geometry exhaust nozzle for a turbojet engine having a rear portion, the nozzle having an outer flap ring with a plurality of driven outer flaps and a plurality of outer interlock flaps, each outer flap being pivotally connected to the rear portion of the turbojet engine, and an inner flap ring having a plurality of inner forward driven flaps and a plurality of inner forward interlock flaps each having a forward portion pivotally attached to the rear portion of the turbojet engine and a rear edge portion, the inner flap ring also having a plurality of inner rear driven flaps and a plurality of inner rear interlock flaps, each inner rear flap having a front edge portion pivotally connected to the rear edge portion of a corresponding inner forward flap, the outer and inner flap rings being radially spaced apart, the variable geometry nozzle comprising:

a) a drive collar located in a space between the inner and outer flap rings and axially movable between forwardmost and rearmost positions substantially parallel to an axis of symmetry of the variable geometry nozzle;

b) a plurality of translating levers, each translating lever pivotally attached to the drive collar and to one of the inner forward driven flaps;

c) a plurality of interlock levers, each interlock lever pivotally connected to the drive collar and to one of the inner rear driven flaps;

d) a plurality of linkrods, each linkrod pivotally connected to one of the interlock levers and to one of the outer driven flaps; and e) at least one actuator connected to the rear portion of the turbojet engine and to one of the translating levers to move the drive collar between its forwardmost and rearmost positions, such movement causing the inner flap ring to move between a converging-diverging configuration and a converging—converging configuration.

2. The variable geometry nozzle of claim 1 wherein the drive collar has a polygonal configuration.

3. The variable geometry nozzle of claim 2 wherein the number of sides on the polygonal drive collar is equal to the number of inner forward flaps.

4. The variable geometry nozzle of claim 2 wherein each interlocking lever is pivotally connected to the drive collar at two adjacent apexes.

5. The variable geometry nozzle of claim 2 wherein each translating lever is pivotally connected to the drive collar at two adjacent apexes.

6. The variable geometry nozzle of claim 2 wherein the drive collar comprises:

a) first and second spaced apart polygonal rings; and b) a plurality of axial members connecting the first and second rings at their apexes.

7. The variable geometry nozzle of claim 6 wherein each translating lever is pivotally connected to two adjacent axial members.

8. The variable geometry nozzle of claim 1 wherein each translating lever comprises:

a) a journal bearing hub;

b) two first lever arms fixedly extending from the hub substantially parallel to each other; and c) two second lever arms fixedly extending from the hub substantially parallel to each other.

9. The variable geometry nozzle of claim 1 wherein each interlock lever has three substantially parallel, non-coplanar pivot axes.

* * * * *